Oct. 5, 1926.
E. QURIN
1,602,312
FISHING LINE
Filed March 24, 1925
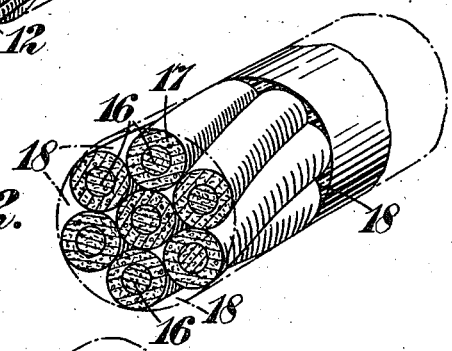
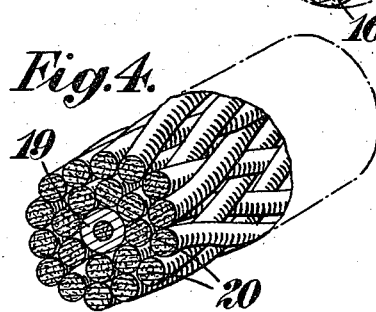
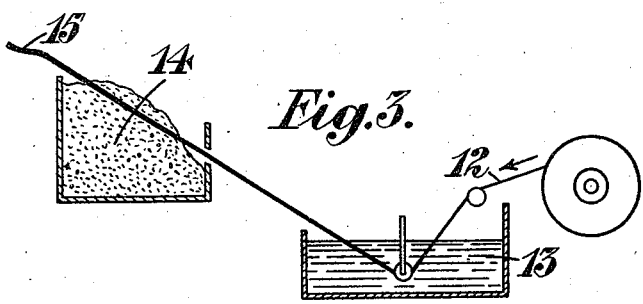
INVENTOR
Eugen Qurin
By Byrnes, Stebbins & Parmelee
His Attys Patented Oct. 5, 1926.

1,602,312

UNITED STATES PATENT OFFICE.

EUGEN QURIN, OF KIRCHBERG-ON-THE-WECHSEL, AUSTRIA, ASSIGNOR TO S. ALLCOCK & COMPANY LIMITED, OF REDDITCH, ENGLAND, A BRITISH COMPANY.

FISHING LINE.

Application filed March 24, 1925. Serial No. 17,902, and in Austria July 23, 1924.

This invention is for improvements in or relating to fishing lines or the like which are required to have certain characteristics according to the manner of their use. It may be required, for example, that a line, cord or rope should be sufficiently buoyant to float in water, whilst the material of which it is generally made and which is suitable from all other points of view, is of too great a specific gravity. Alternatively, a line may be required to be made heavier than it would be with materials ordinarily used, such for example as when a fishing line is used for casting in windy weather, and the present invention has for its object to provide an improved construction of line whereof the characteristic lightness or heaviness can be predetermined according to the requirements.

According to the invention, a fishing line or the like comprises a plurality of members all extending along its length, one or more of them being of or having incorporated with it a material different from that of the other or others, said material in comminuted form being selected as to its specific gravity so as to lighten or alternatively weight the line, for the purpose set forth.

According to another feature of this invention a fishing line or the like may comprise a plurality of strands whereof one or more is of, or has incorporated with it, a material different from that of the other strands and is selected as to its specific gravity so as to lighten or weight the line, for the purpose set forth.

As applied to a lightened fishing line, this invention comprises a line wherein one or more strands has adhesively secured to it a layer of cork or other buoyant material.

According to yet another feature of the invention, the core or filling aforesaid may be constituted by a strand or strands whereto a layer of cork particles or other buoyant material in comminuted form has been adhesively secured.

This invention also covers the improved method of manufacturing fishing lines and the like as hereinafter described.

In the accompanying drawings, which are purely diagrammatic—

Figure 1 shows to a greatly enlarged scale a construction of lightened fishing line;

Figure 2 is a similar view of a modified construction;

Figure 3 illustrates diagrammatically a method of manufacturing a line in accordance with this invention, and Figure 4 is a view similar to Figures 1 and 2, showing a weighted line.

In the construction illustrated in Figure 1, the line comprises a core 10 of cork or like buoyant material which is covered with or enclosed by a sheath 11. The sheath is preferably of braided or twisted cotton, flax, hemp, linen or silk or other material, such as is ordinarily used for fishing lines. Such a line may be impregnated with any desired material in order to water-proof it or impart to it the other characteristics of "dressed" or waterproofed lines.

The cork or like core 10 may be made in any desired manner, but a preferred method of constructing it is illustrated diagrammatically in Figure 3. A thread 12 of cotton or like fibrous material is passed through a bath 13 of rubber solution or other suitable, preferably waterproof, adhesive so as to receive a coating thereon, or is "dressed" in any desired manner. The coated line then has applied to it cork in the form of small particles, this being conveniently effected by passing the line through a vessel containing the granulated cork 14, after which the coated line 15 is allowed to dry. The cork particles may be of any desired size, and it has been found in practice that if the cork is powdered to a fineness resembling that of granulated sugar, good results can be obtained. It will be appreciated that if the cork is in the form of a fine powder the layer of cork which adheres to the cotton 12 is correspondingly thinner. This fine powder could be used, if so desired, by arranging several superimposed layers of it.

After the cotton 12 with the adhesive and the cork layer upon it has dried, the cork is consolidated and compressed preferably to cylindrical formation. This may be effected by rolling it between flat surfaces, by passing it through suitably-shaped rollers, or by passing it through suitably tapered dies. The product thus formed is a continuous filament of cork and the outer sheath 11 (Figure 1) may be braided directly upon this as a core.

Figure 2 illustrates a modified construction of line; in this case the various strands 16, which may be for example of silk, of which the line is composed, are each coated individually with a cork layer 17 and the various strands are then braided, plaited or twisted together to form the finished line. Such lines may, if desired, be "dressed" with any suitable composition as indicated diagrammatically at 18.

Figure 4 illustrates yet another application of this invention, representing diagrammatically a fishing line which is required to be somewhat heavier than usual. In this case the core 19 is made of a substance having a suitably high specific gravity and the ordinary braided silk or other fibre sheath 20 surrounds the core. The core is made of any suitably heavy powdered material, such as powdered lead, in the manner described above with reference to Figure 3.

Whilst cork and lead have been mentioned above as specific examples of suitable materials for achieving lightness or heaviness of a line, it is to be understood that the invention is not limited to these particular materials, for various other materials can be used, such for example as kapok fibre, in one case, or copper in the other case, for the purpose of producing in accordance with this invention a line whereof the characteristic of lightness or heaviness can be predetermined in accordance with any special requirements. It will be appreciated that such substances as cork and kapok fibre on the one hand, and lead and copper on the other hand, differ substantially as to their specific gravity from that of oil, wax, tar, size an like waterproofing agents which have heretofore been used for the purpose of waterproofing fishing lines. Furthermore, the invention is not limited to fishing lines, for it may advantageously be used in other circumstances; thus, for example, it may be applied to ropes used for supporting fishing nets, the rope being made buoyant in order to avoid the use of floats. Finally, it will be understood that lines constructed in accordance with this invention do not differ substantially in strength, flexibility or appearance from lines as hitherto manufactured.

What I claim as my invention and desire to secure by Letters Patent is:—

1. In a cord, the combination of a plurality of members which all extend along its length and are of a material having a specific gravity greater than that of water, and another member also extending along the length of the cord, which other member is coated with a material of less specific gravity than water and has the coating of such thickness as to render the whole cord buoyant, said coated member being substantially enclosed by the members having a specific gravity greater than water.

2. The method of making a cord of predetermined specific gravity consisting in drawing a fibre through a bath of adhesive, applying a layer of particles selected as to their specific gravity thereto, drying said strand and particles, compressing said particles into a substantially continuous layer, and combining said coated strand with other strands.

3. The method of forming a cord consisting in drawing a fibre of cotton through a bath of waterproof adhesive, applying a layer of cork particles thereto, compressing said layer and braiding a sheath of fibrous material on said cork-covered fibre as a core.

In testimony whereof I affix my signature.

EUGEN QURIN.